United States Patent
Krstanovski et al.

(10) Patent No.: US 6,853,648 B1
(45) Date of Patent: Feb. 8, 2005

(54) METHOD, APPARATUS, AND SYSTEM FOR ENABLING COMMUNICATION BETWEEN SECOND GENERATION AND THIRD GENERATION PACKET DATA NETWORKS

(75) Inventors: Tony Krstanovski, Mölndal (SE); Hans Rönneke, Kungsbacka (SE); Hans-Olof Sundell, Öckerö (SE); Klas Hjelmgren, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 648 days.

(21) Appl. No.: 09/657,685

(22) Filed: Sep. 8, 2000

Related U.S. Application Data
(60) Provisional application No. 60/152,748, filed on Sep. 8, 1999.

(51) Int. Cl.[7] .................................................. H04J 3/16
(52) U.S. Cl. ....................... 370/465; 370/328; 370/401; 370/466
(58) Field of Search ............................... 370/401, 465, 370/466, 328, 467

(56) References Cited

U.S. PATENT DOCUMENTS

| | | | | |
|---|---|---|---|---|
| 5,579,316 A | * | 11/1996 | Venters et al. | 370/392 |
| 5,793,771 A | * | 8/1998 | Darland et al. | 370/467 |
| 5,978,386 A | * | 11/1999 | Hamalainen et al. | 370/466 |
| 6,233,458 B1 | * | 5/2001 | Haumont et al. | 455/445 |
| 6,377,804 B1 | * | 4/2002 | Lintulampi | 455/435.2 |
| 6,542,516 B1 | * | 4/2003 | Vialen et al. | 370/465 |
| 6,584,098 B1 | * | 6/2003 | Dutnall | 370/354 |
| 6,594,486 B1 | * | 7/2003 | Rasanen | 455/422.1 |
| 6,658,011 B1 | * | 12/2003 | Sevanto et al. | 370/401 |
| 2002/0085512 A1 | * | 7/2002 | Lehtimaki et al. | 370/328 |
| 2002/0086667 A1 | * | 7/2002 | Suvanen | 455/422 |
| 2002/0155825 A1 | * | 10/2002 | Haumont et al. | 455/412 |

FOREIGN PATENT DOCUMENTS

| | | | | |
|---|---|---|---|---|
| EP | 1079643 A1 | * | 2/2001 | H04Q/7/22 |
| EP | 1079655 A1 | * | 2/2001 | H04Q/7/38 |

OTHER PUBLICATIONS

ETSI EN 301 347 v6.7.0 (Jul. 2000), "Digital Cellular Telecommunications System (Phase 2 + ); General Packet Radio Service (GPRS); GPRS Tunnelling Protocol (GTP) across the Gn and Gp Interface", GSM 09.60 version 6.7.0 Release 1997.

Granbohm, H. et al., "GPRS—General Packet Radio Service", Ericsson Review No. 2, pp. 82–88, 1999.

http://www.mobileGPRS.com/whatis.htm, "What is GPRS", Aug. 1, 2000.

(List continued on next page.)

*Primary Examiner*—Huy D. Vu
*Assistant Examiner*—Clemence Han

(57) ABSTRACT

Communication is enabled between a first network in which control functions and user functions are combined in a first node and a second network in which user functions are implemented in a second node, and control functions are implemented in a third node. A determination is made whether data received contains control data. If so the control data is extracted from the received data and is forwarded to the third-node in which control functions are handled. The control data is used for resource handling. The extraction and forwarding may be performed in the first, second, or third node, or at any surface in between. If the received data does not contain control data, the data will be forwarded to the second node. The first network may be a second generation data packet network, e.g., a Global Packet Radio Service (GPRS) network, and the second network may be a third generation packet data network., e.g., a Universal Mobile Telecommunication System (UMTS) network.

10 Claims, 5 Drawing Sheets

OTHER PUBLICATIONS

ETSI, "Universal Mobile Telecommunications System (UMTS). General Packet Radio Service (GPRS). GPRS Tunnelling Protocol (GTP) across the Gn and Gp Interface", 3G TS 29.060 v. 3.3.0 Rel. 1999, ETS Jan. 2000, pp. 1–78, XP002160540, entire document.

Berruto, E, "Research Activities on UMTS Radio Interface, Network Architectures, and Planning", IEEE Communications Magazine, US, IEEE Service Center, vol. 36 No. 2, pp. 82–95, Feb. 1, 1998.

Schieder, A., et al. "GRAN—A New Concept for Wireless Access in UMTS", ISS, World Telecommunications Congress, pp. 339–345, Sep. 21, 1997.

Brasche, G., et al., "Concepts, Services and Protocols fo the New GSM Phase 2 + General Packet Radio Service" IEEE Communications Magazine, US, IEEE Service Center, vol. 35, No. 8, pp. 94–104, Aug. 1, 1997.

Peter Kahl, Editor, "The Future Telecommunication Network of the Deutsche Bundespost", R.v. Decker's Taschenbuch Telekommunikation, 1986, R. v. Decker's Verlag, G. Schenck GmbH, Heidelberg, Printed by Druckhaus Darmstadt, 6100 Darmstadt, ISBN 3–7685–2286–5.

\* cited by examiner

METHOD, APPARATUS, AND SYSTEM FOR ENABLING COMMUNICATION BETWEEN SECOND GENERATION AND THIRD GENERATION PACKET DATA NETWORKS

This application claims priority from U.S. Provisional Patent Application No. 60/152,748, which was filed on Sep. 8, 1999, and which is expressly incorporated here by reference.

BACKGROUND

This invention relates generally to a method, apparatus, and system for enabling communication between networks. More particularly, this invention relates to a method, apparatus and system and method for enabling communication between second generation and third generation packet data networks.

There are many types of public land mobile networks (PLMNs), e.g., a Global System for Mobile Communications (GSM), a Digital Cellular System for Mobile Communications (DCS 1800), and a Personal Communication System (PCS). These networks provide a wide range of services and facilities to mobile subscribers that are roaming around between individual cells of the mobile radio communication networks. These networks support circuit-switched communication.

Global Packet Radio Service (GPRS) has been developed to support packet-switched communication. GPRS is supported in second generation systems, e.g., second generation GSM systems.

A Universal Mobile Telecommunications System (UMTS) is currently being standardized within the 3rd Generation Partnership Project (3GPP), which is a cross-regional cooperative project to develop a third generation standard which can be accepted in as many regions of the world as possible. The UMTS will build on the success of the GSM system.

The UMTS will support both circuit-switched data communication and packet-switched communication. Thus, the UMTS will be useful for exchanging voice and non-voice data quickly and efficiently.

FIG. 1 illustrates an exemplary network supporting circuit-switched and packet-switched communication. In FIG. 1, a mobile station (MS) communicates with one or more Public Land Mobile Networks (PLMNs). A first network (PLMN1) is considered the Home PLMN (HPLMN) and includes a Home Location Register (HLR) containing subscriber data for subscribers to the network. The HPLMN also includes a Gateway GPRS Support Node (GGSN) for enabling packet-switched communication. PLMN2 and PLMN3 are considered visiting PLMNs. Each PLMN, other than the HPLMN, includes one or more Mobile Switching Centers (MSCs) for performing circuit switching for the mobile station and one or more Visitor Location Registers (VLRs) for storing data regarding subscribers to other networks that may be roaming in the network. The PLMNs also include Serving GPRS Support Nodes (SGSNs) for supporting packet-switched communication.

The HLR of PLMN1 communicates with VLR1, VLR2, and VLR3 for updating subscriber information, e.g., when a subscriber roams into an area served by one of these VLRs. The VLRs also communicate with each other.

The SGSNs are at the same hierarchal level in the network as the MSC/VLRs and function in a similar manner as the VLRs, but for packet-switched communication. The SGSNs keep track of the location of the GPRS user, perform security functions, and handle access control. The SGSNs communicate with the HLR to obtain subscriber profiles. The SGSNs also communicate with each other, and the SGSN of PLMN3 communicates with the base station subsystem (BSS) which, in turn, communicates with the MSC connected to VLR2 and with the MS.

The GGSN is the interconnection point for packet data between the GPRS network and the public data network. The GGSN is connected to the SGSNs via an Internet Protocol (IP) backbone. User data, e.g., from a GPRS terminal to the Internet, is sent encapsulated over the IP Backbone.

To accomplish roaming between GPRS and UMTS packet data networks, signaling between the networks and forwarding of user data are required. However, the network architectures for GPRS and UMTS networks are different, thus making interaction between the networks difficult.

In a second generation GPRS network, communication is performed node to node, as shown in FIG. 2. Second generation GPRS support nodes (2G-GSNs), e.g., GGSNs and SGSNs, communicate with each other using a GPRS tunneling protocol (GTP) described in, e.g., "GPRS Tunnelling Protocol (GTP) across the Gn and Gp Interface", GSM 09.60 ver. 6.7.0 release 1997, Draft ETSI EN 301 347 v6.7.0 (July 2000).

In a third generation UMTS network, communication is performed in two different planes, as shown in FIG. 3. In FIG. 3, third generation GSN (3G-GSN) servers communicate with each other using a GPRS tunneling control protocol (GTP-C), and the 3G-GSN gateways also communicate with each other using a GPRS tunneling user protocol (GTP-U). The 3G-GSN gateways also communicate with the 3G-GSN servers using a gateway control protocol (GCP). The 3G-GSN gateways and servers may be GGSNs and/or SGSNs.

Problems occur when a second generation GPRS node (2G-GSN) attempts to interact with a third generation UMTS node (3G-GSN) because the 2G-GSN nodes and the 3G-GSN nodes support different kinds of protocols. As shown in FIG. 4, the GTP used for communication between 2G-GSN nodes tunnels both user and control data, while the GTP-C used for communicating between 3G-GSN servers tunnels only control data, and the GTP-U used for communicating between 3G-GSN gateways tunnels only user data. There is no protocol by which the 2G-GSN can communicate with a 3G-GSN server or a 3G-GSN gateway. Also, the GTP can only address one node, whereas the 3G-GSN Server and 3G-GSN Gateway are placed in two different nodes.

Currently, there is no provision permitting a 2G-GSN node to interact with the 3G-GSN server or a 3G-GSN gateway.

Thus, there is a need for a technique permitting 2G-GSNs to interact with 3G-GSN servers and 3G-GSN gateways to permit roaming between GPRS and UMTS networks.

SUMMARY

It is therefore an object of the invention to permit interaction of different networks such as second generation GPRS and third generation UMTS networks. It is a further object of the invention to permit roaming of a subscriber between different networks.

According to exemplary embodiments, these and other objects are achieved by a method, apparatus and system for communicating between a first network in which control functions and user functions are combined in a first node and a second network in which user functions are implemented in a second node, and control functions are implemented in a third node. A determination is made whether data received includes control data. If so, control data is extracted from the data and forwarded to the third node. The control data is used for resource handling. The extraction and forwarding may be performed in the first, second, or third node or at any place in between. If the received data does not contain control data, the data will be forwarded to the second node. The first network may be a second generation data packet network, e.g., a Global Packet Radio Service (GPRS) network, and the second network may be a third generation packet data network., e.g., a Universal Mobile Telecommunication System (UMTS) network.

BRIEF DESCRIPTION OF THE DRAWINGS

The features, objects, and advantages of the invention will become apparent by reading this description in conjunction with the accompanying drawings, in which like reference numerals refer to like elements and in which.

DETAILED DESCRIPTION

The following describes exemplary embodiments of methods and apparatus that enable different networks to communicate with each other. Communication is made possible by using a protocol splitter to separate user data and control data.

Figure 1:
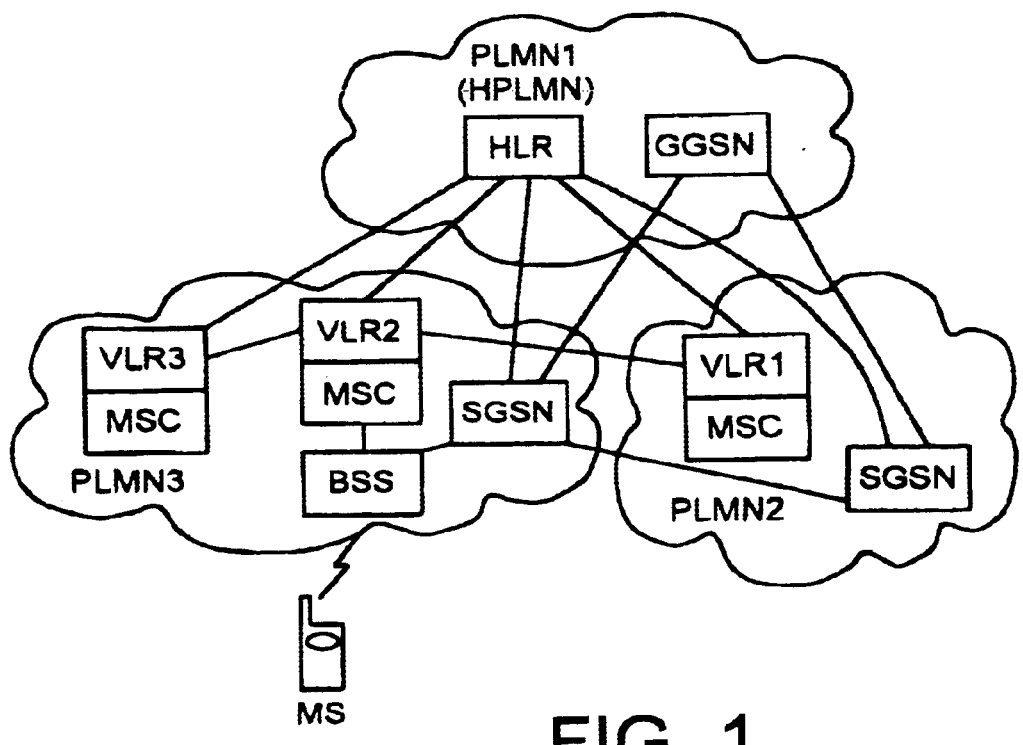
FIG. 1 illustrates an exemplary network supporting circuit-switched and packet-switched communication.
Figure 4:
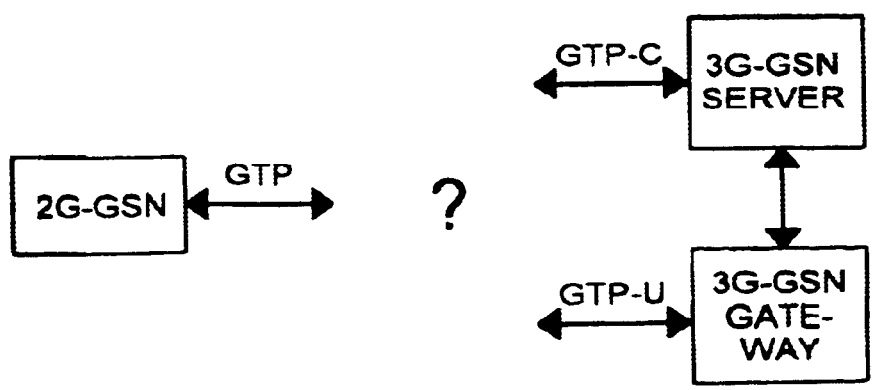
FIG. 4 illustrates a problem encountered when attempting to interact between UMTS and GPRS networks.
Figure 2:
FIG. 2 illustrates an exemplary second generation GPRS communication architecture.
Figure 3:
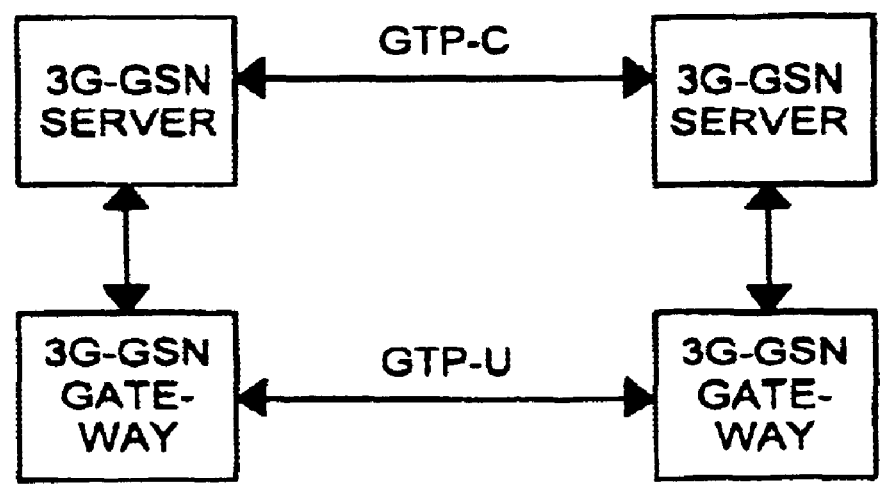
FIG. 3 illustrates an exemplary third generation UMTS communication architecture.
Figure 5A:
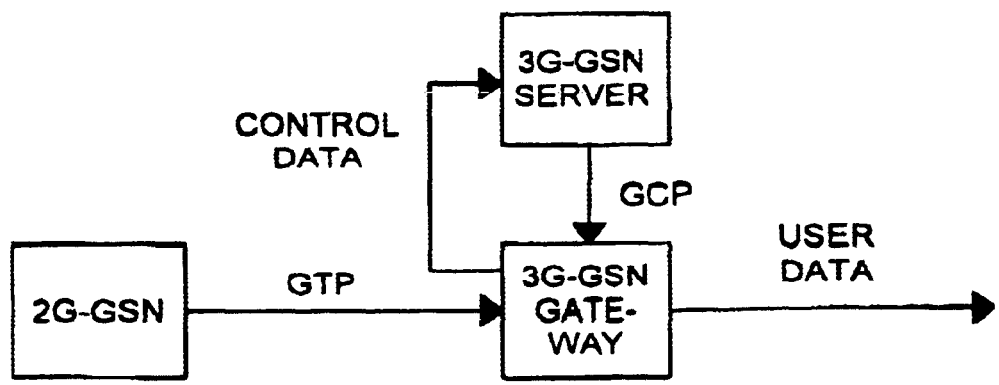
FIGS. 5A and 5B illustrate exemplary systems for communicating between a second generation GPRS network and a third generation UMTS network.
Figure 5B:
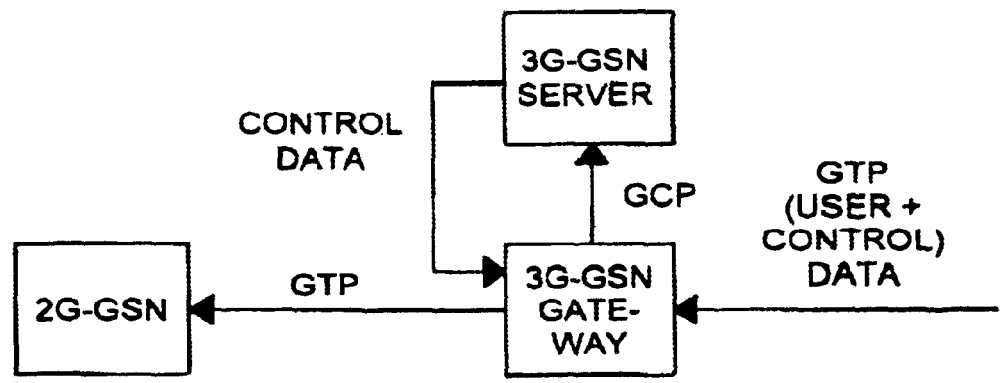

FIGS. 5A and 5B illustrate exemplary systems for enabling communication between a second generation network and a third generation network.

In FIG. 5A, communication in the direction from the 2G-GSN node to the 3G-GSN gateway is shown, while in FIG. 5B, communication in the direction of the 3G-GSN gateway to the 2G-GSN is shown.

Referring to FIG. 5A, when control data is transferred from a 2G-GSN node to the 3G-GSN gateway, a GTP protocol splitter extracts the control data from the GTP tunnel and sends it to the 3G-GSN server. In FIG. 5A, the GTP protocol splitter is included in the 3G-GSN gateway. The 3G-GSN gateway processes the user data from the 2G-GSN node as if it were a 2G-GGSN. The 3G-GSN server processes the control data, and resource handling is performed using a control protocol, e.g., a gateway control protocol (GCP), in a server-gateway control loop. Resource handling is a function implemented in a 3G-SGSN server that checks that there is enough resources in terms of hard disk and CPU memory space before allowing a user to attach to the server. If there are no resources left, the user will be denied access to the server. It will be appreciated that many forms of GCP may be used, e.g., H.248, XCP, or Internet Engineering Task Force (IETF) MEGACO.

To distinguish between control data and user data in the data received at the protocol splitter functionality in the 3G-GSN gateway, two fields are provided in the GTP header in each packet: a version number field, and a message type field. The version number field may be bits 6–8 in octet 1 of the GTP header as described in GSM 09.60, ver. 6.7.0 (which was cited above and is expressly incorporated here by reference). A value 0 in the version number field advantageously corresponds to the GTP, and other values may be used to indicate other versions of GTP, e.g., a protocol in which control data and user data are integrated. The message type field in the GTP header indicates whether the GTP packet is a control message or user data. The message type field may be octet 2 of the GTP header and preferably has a predetermined value, e.g., 255 (in is decimal), for user data packages, and other values indicate control data packages.

Figure 6:
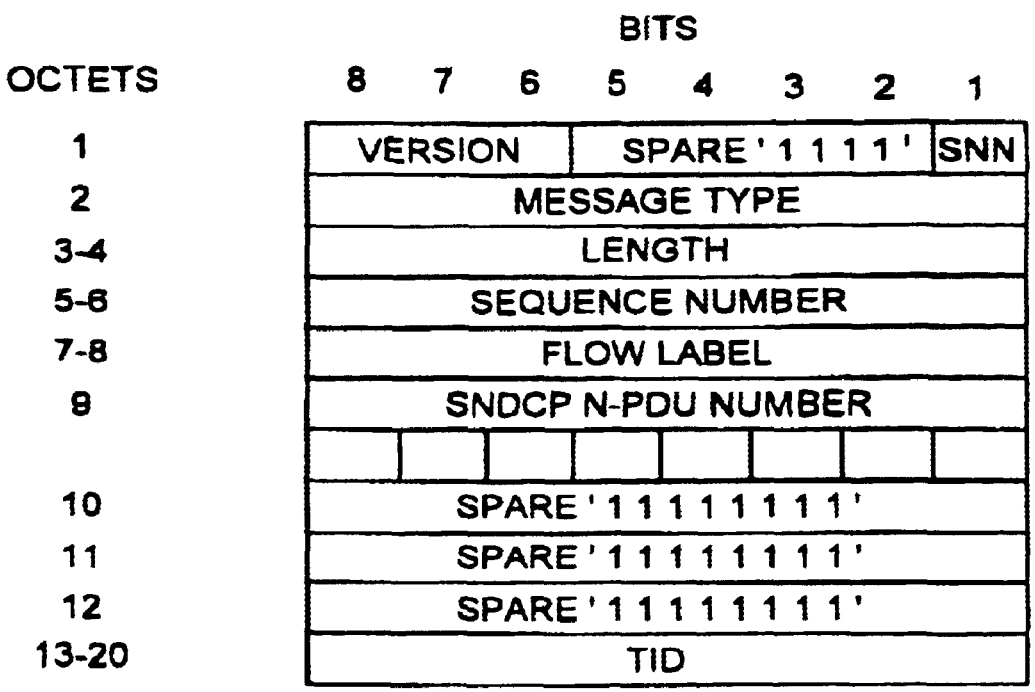
FIG. 6 illustrates a GTP header.

FIG. 6 is an outline of a GTP header that includes twenty octets, including the version number and message type fields described above, and several other fields, including a number of spare 1 bits, a flag SNN, a length indicating the length in octets of the GTP message, a sequence number that is a transaction identity for signaling messages and an increasing sequence number for tunnelled original packets (i.e., the payload tunnelled in the GTP tunnel), a flow label that unambiguously identifies a GTP flow, a tunnel identifier (TID). It will be appreciated that FIG. 6 depicts only one of many configurations of GTP header that can be used.

The GTP protocol splitter functionality, together with the server-gateway control loop, enables communication between a GPRS traditional network architecture and an UMTS server-gateway network architecture. Advantageously, all interfaces conform to applicable standards.

Control signaling in the opposite direction, i.e., from the 3G-GSN network to the 2G-GSN network, is simpler, as illustrated by FIG. 5B. The 3G-GSN server sends GTP-C messages to the 3G-GSN gateway, which converts them to GTP and forwards them to the 2G-GSN node. A command on the GTP-C link to the 3G-GSN server from the GTP-splitter, e.g., in the 3G-GSN gateway, results in a new command on the GCP link back to the 3G-GSN gateway.

An event in the 3G-GSN gateway, triggered by, e.g., an incoming GTP control packet as in FIG. 5B, triggers a GCP-notification to be sent to the 3G-GSN server. The 3G-GSN server then sends GTP-C packets to the 3G-GSN gateway, which converts them to GTP packets and forwards them to the 2G-GSN node.

By implementing the GTP protocol splitter and a server-gateway control loop in the 3G-GSN gateway, full integration with the second generation GPRS network is made possible. The GTP protocol splitter may be implemented in a 3G-GSN gateway. The user traffic is processed inside the 3G-GSN gateway, and the control traffic is forwarded to and from the corresponding 3G-GSN server. Therefore, no additional protocols are required for the server. Also, the network operator does not require additional equipment to make the UMTS network interact with GPRS. The converter enables the operator to introduce UMTS in a limited area without affecting the 2G-GSN nodes. Communication between traditional network architecture and a server-gateway architecture is enabled, and the IP address problem when these architectures communication is solved. Traditional combined nodes (2G-GSN) do not need to be upgraded to communicate with server-gateway nodes (3G-GSN).

The 3G-GSN gateway acts as a 2G-SGSN node for uplink communication, i.e., for traffic from a 3G-SGSN gateway to a 2G-SGSN node. However, the downlink traffic is also made possible, e.g., when the 2G-GSN node is a GPRS GGSN. In such a case, for downlink traffic, the GTP still go to the 3G-GSN gateway, but the 3G-GSN gateway acts as a 2G-SGSN.

Although described above as being located in the 3G-GSN gateway, the GTP protocol splitter may be physically located in a separate box or node. In terms of hardware, the GTP splitter can be implemented in an integrated circuit, such as a field programmable gate array (FPGA) or other application specific integrated circuit (ASIC), mounted on a printed circuit board, which preferably is an already existing interface board in the node.

Figure 7:
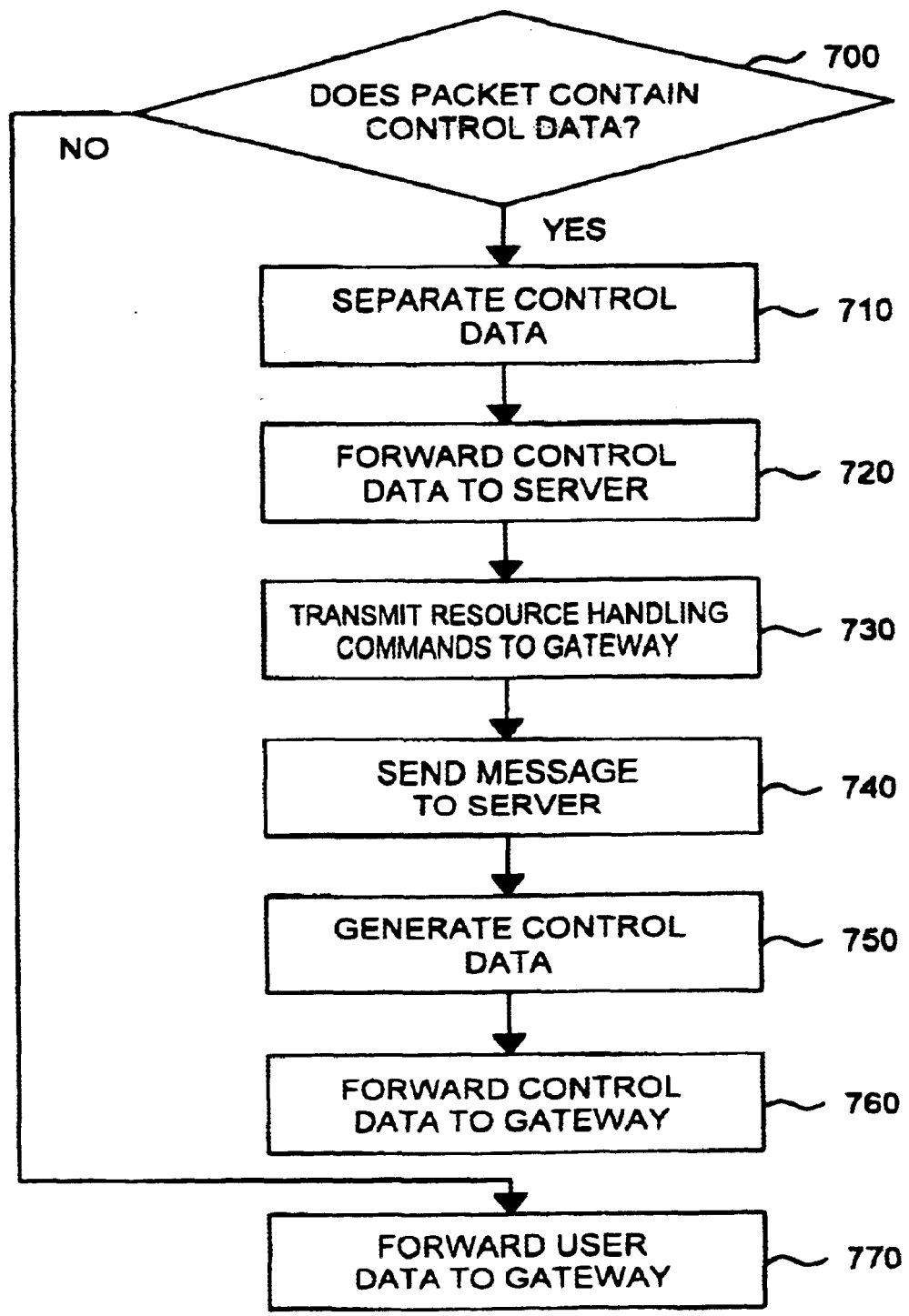
FIG. 7 illustrates a method for communicating between a second generation GPRS network and a third generation UMTS network.

FIG. 7 illustrates an exemplary method for communicating between different networks. The method begins at step 700 at which a determination is made whether data received at the protocol splitter contains control data by detecting the GTP header. If the received data contains control data, the control data is separated from the received data at step 710 and forwarded to the 3G-GSN server at step 720. The 3G-GSN server then transmits commands for resource handling to the 3G-GSN gateway via the GCP at steps 730–760. If, at step 700, it is determined that the received data does not contain control data, the 3G-GSN gateway simply processes the packet and forwards it to the 2G-GSN in step 770.

It will be appreciated by those of ordinary skill in the art that this invention can be embodied in other specific forms without departing from its essential character. The embodiments described above should therefore be considered in all respects to be illustrative and not restrictive.

We claim:

1. A method for enabling communication between a first network in which control functions and user functions are combined in a first node and a second network in which control functions and user functions are separately implemented in second and third nodes, respectively, wherein the first node in a second generation Global Packet Radio Service (GPRS) node, the second node is a third generation GPRS support node server and the third node is a third generation GPRS support node gateway, the method comprising the steps of:

receiving a communication in the second node;

determining whether the received communication contains control data;

if the received communication contains control data, extracting control data from the received communication utilizing a GPRS Tunneling Protocol (GTP) splitter;

forwarding the control data to the second node for processing and resource handling; and processing user data from the communication in the third node.

2. The method of claim 1, wherein if the received communication does not contain control data, the received communication is processed by the third node and then forwarded to the first node.

3. The method of claim 1, wherein the steps of extracting and forwarding control data are performed in the third node.

4. The method of claim 1, wherein the first network is a second generation packet data network, and the second network is a third generation packet data network.

5. The method of claim 4, wherein the first network is a second generation Global Packet Radio Service (GPRS) network, and the second network is a third generation Universal Mobile Telecommunication System (UMTS) network.

6. An apparatus for enabling communication between a first network in which control functions and user functions are combined in a first node and a second network in which control functions and user functions are separately implemented in second and third nodes, respectively, wherein the first node is a second generation Global Packet Radio Service (GPRS) node, the second node is a third generation GPRS support node gateway and the third node is a third generation GPRS support node gateway, the apparatus comprising:

a receiver in the third node for receiving a communication;

a detector for detecting whether the received communication contains control data;

a GPRS Tunneling Protocol (GTP) splitter for extracting detected control data from the received communication; and forwarding the control data to the second node for resource handling, wherein user data from the communication is processed in the third node.

7. The apparatus of claim 6, wherein if the received communication does not contain control data, the received communication is forwarded by the third node to the first node.

8. The apparatus of claim 6, wherein the protocol splitter is included in the third node.

9. The apparatus of claim 8, wherein the first network is a second generation packet data network, and the second network is third generation packet data network.

10. The apparatus of claim 9, wherein the first network is a second generation Global Packet Radio Service (GPRS) network, and the second network is a third generation Universal Mobile Telecommunication System (UMTS) network.

* * * * *